US008263884B1

(12) United States Patent
Salmon et al.

(10) Patent No.: US 8,263,884 B1
(45) Date of Patent: Sep. 11, 2012

(54) TILT SWITCH ACTIVATED LIGHT FOR USE WITH A VEHICLE EGRESS

(75) Inventors: Michael E. Salmon, Madison, AL (US); Joseph D. Polk, Madison, AL (US); Paul W. Hunkele, Cranberry Township, PA (US)

(73) Assignee: Ibis Tek, LLC, Butler, PA (US)

( * ) Notice: Subject to any disclaimer, the term of this patent is extended or adjusted under 35 U.S.C. 154(b) by 106 days.

(21) Appl. No.: 12/962,700

(22) Filed: Dec. 8, 2010

(51) Int. Cl.
*H01H 35/02* (2006.01)
*H01H 35/14* (2006.01)
*G01P 15/135* (2006.01)

(52) U.S. Cl. .......... 200/61.45 M; 200/61.45 R; 335/206

(58) Field of Classification Search .................. 335/206; 200/61.45 M, 61.45 R, 61.52, 61.44
See application file for complete search history.

(56) References Cited

U.S. PATENT DOCUMENTS 3,601,729 A * 8/1971 Hierta .......................... 335/205
3,659,062 A * 4/1972 Shea ...................... 200/61.45 R
3,748,415 A * 7/1973 Suzuki ................. 200/61.45 M
4,097,698 A * 6/1978 Jackman ................ 200/61.45 R
4,378,475 A * 3/1983 McNiel .................. 200/61.45 R
4,533,801 A * 8/1985 Jackman et al. ....... 200/61.45 R
5,256,839 A * 10/1993 Gallagher .................. 200/61.52
5,283,402 A * 2/1994 Green .................... 200/61.45 R
5,909,173 A * 6/1999 Mason et al. ................. 340/467
5,965,855 A * 10/1999 Tanazawa et al. .... 200/61.45 M
6,005,205 A * 12/1999 Chou .................... 200/61.45 M
2002/0053502 A1* 5/2002 Burmester et al. .... 200/61.45 M
2002/0117385 A1* 8/2002 Kastura ................. 200/61.45 R

OTHER PUBLICATIONS

Tilt Sensor, www.ladyada.net/learn/sensors/tilt.html, Nov. 16, 2010, pp. 1-7.

* cited by examiner

*Primary Examiner* — Lincoln Donovan
*Assistant Examiner* — Alexander Talpalatskiy
(74) *Attorney, Agent, or Firm* — Karen Tang-Wai Sodini

(57) ABSTRACT

A tilt switch activated light apparatus suitable for use in connection with an egress of a vehicle, the apparatus including a magnet disposed within a cavity of a housing, where the cavity is shaped so that in the event of excessive roll or pitch of the vehicle, the magnet moves to a location adjacent a switch connecting a power source to a light source, causing the switch to close and so activating the light source. An external body, either ferromagnetic or magnetic, and external to the housing and removable therefrom, may be used to hold the magnet inside the cavity in a neutral position, away from the switch, during shipping.

5 Claims, 4 Drawing Sheets

TILT SWITCH ACTIVATED LIGHT FOR USE WITH A VEHICLE EGRESS

FIELD OF THE INVENTION

The present invention pertains to the field of tilt switches, and more particularly, tilt switches that switch on power to a light in case of a vehicle undergoing excessive roll or pitch, for use with a vehicular egress such as a door or window or escape hatch.

BACKGROUND OF THE INVENTION

After a collision or other substantial force has been exerted on a vehicle, the vehicle's occupants often need to exit quickly from the vehicle, but the occupants may not be able to locate an egress structure such as a door or a window without some difficulty, particularly in night time conditions or generally because of a loss of power to the vehicle causing interior lighting to be nonfunctional.

What is needed is an apparatus that makes an egress, such as an escape hatch, a window, or a door, and especially release mechanisms (handles or latches) for such means of escape from the vehicle visible even in the dark so that they are more easily located and used.

SUMMARY OF THE INVENTION

Accordingly, the invention provides a tilt switch activated light apparatus for use as a component of or as an attachment to a vehicle egress structure, for switching on power from a power source to a light in the event of excessive roll or pitch of the vehicle, where both the light and power source are included with the apparatus so that power is available for the light independent of any other vehicle power source, and the light can serve as a guide to the location of the vehicle egress structure in the event of the vehicle tipping over.

A tilt switch activated light apparatus according to the invention is intended to be placed in a vehicle near or attached to an egress, and includes a magnet in a cavity shaped so that in the event of excessive roll or pitch of the vehicle, the magnet moves toward a power switch module included in the apparatus, and by magnetic attraction causes a switch included in the power switch module to close, turning on a light included with the apparatus so that the light can guide vehicle occupants to the egress.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
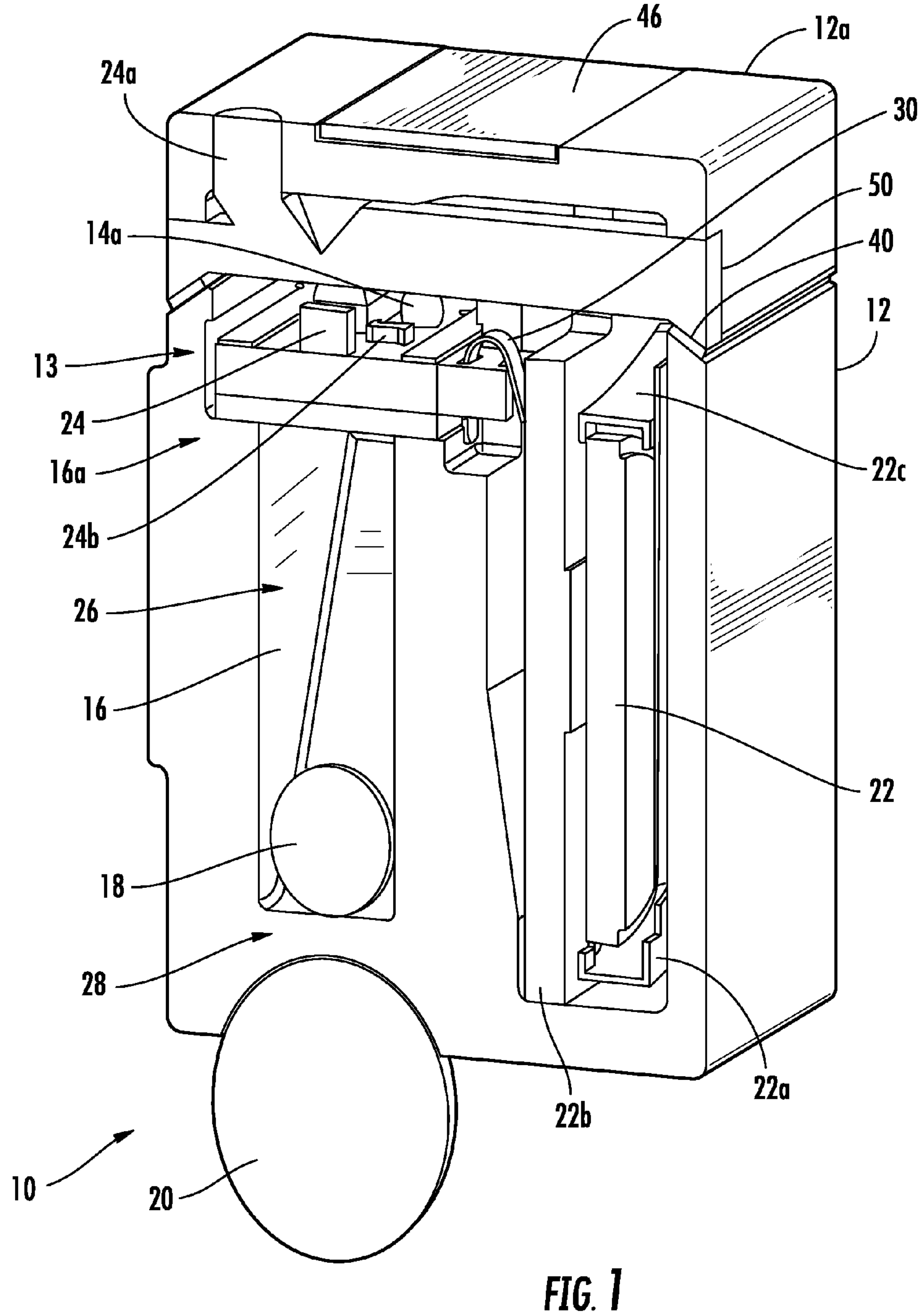
FIG. 1 is a perspective cross-sectional view of a tilt switch activated light apparatus according to the invention, showing a cavity within a housing, a magnet disposed within the cavity, and a power switch module.

The following is a list of reference labels used in the drawings to label components of different embodiments of the invention, and the names of the indicated components.

| | |
|---|---|
| 10 | tilt switch activated light apparatus |
| 12 | housing |
| 12a | housing cover |
| 13 | power switch module |
| 14 | switch |
| 14a | ferrous body |
| 14b | ferrous switch element |
| 16 | cavity |
| 16a | cavity first side |
| 18 | magnet |
| 20 | external body |
| 22 | power source |
| 22a | power source holder |
| 22b | power source circuit board |
| 22c | power source retainer |
| 24 | light source |
| 24a | light pipe |
| 26 | damping fluid |
| 28 | base vertex |
| 30 | pin |
| 32 | first gasket |
| 34 | retainer |
| 36 | power switch module printed circuit board |
| 40 | second gasket |
| 42 | first target area |
| 44 | second target area |
| 46 | strap |
| 50 | aperture |

DETAILED DESCRIPTION

Referring now to FIGS. 1-4, the invention provides a tilt switch activated light apparatus 10 suitable for use with an egress of a vehicle, such as a door, window, or escape hatch. The apparatus 10 senses when the vehicle roll (about the longitudinal axis of the vehicle) or pitch (rotation about a horizontal axis normal to the longitudinal axis) exceeds a predetermined extent, and switches on a light included with the apparatus in such an event. The apparatus includes a housing 12 and a housing cover 12*a* defining an interior space, the interior space having a cavity 16 of a predetermined size and shape, and a power switch module 13 sandwiched between a first gasket 32 and a second gasket 40. A strap 46 holds the housing cover 12*a* tight against the housing 12.

Figure 2:
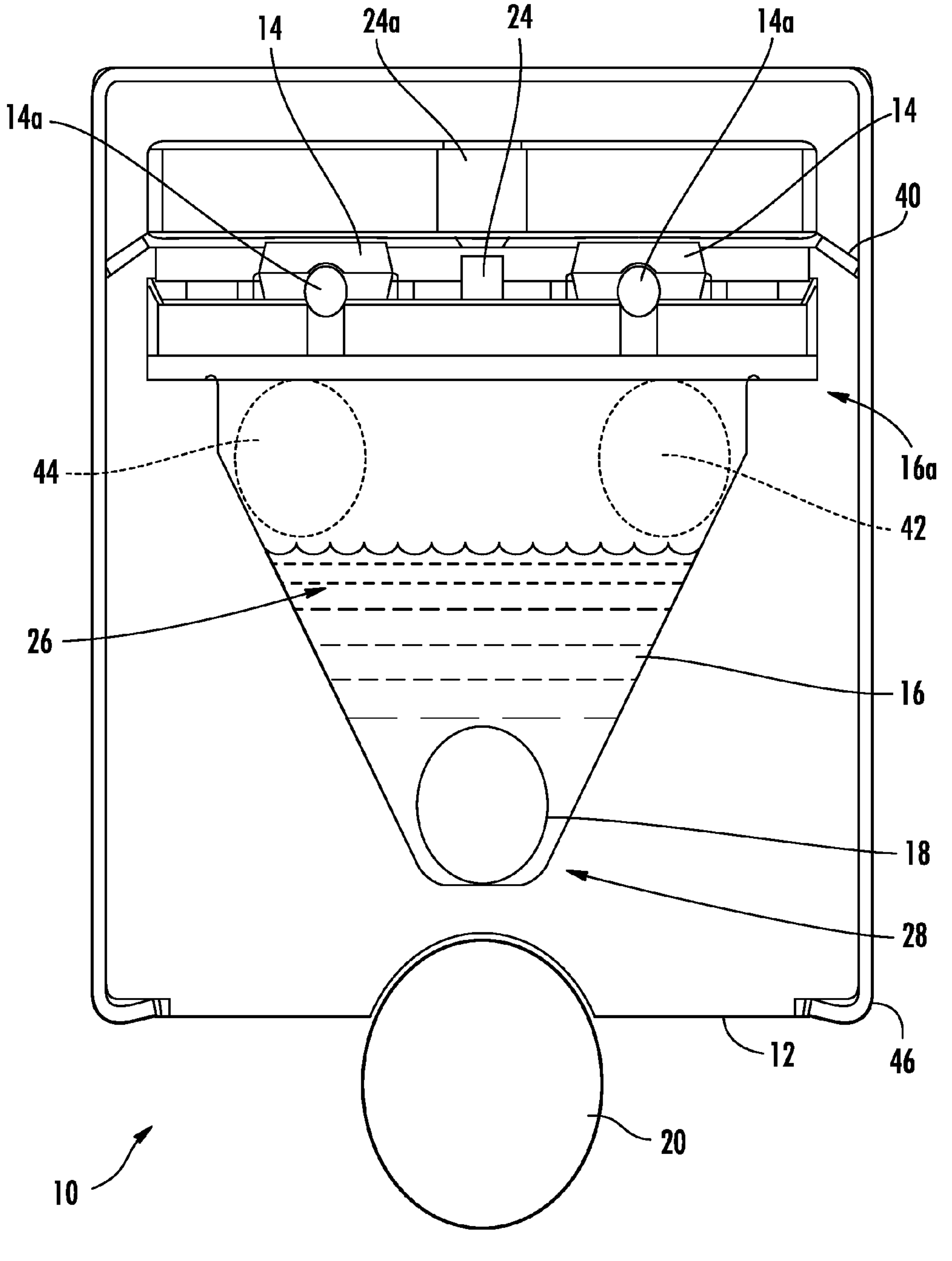
FIG. 2 is a front elevation, cross-sectional view of the tilt switch activated light apparatus shown in FIG. 1.

Referring now more particularly to FIG. 1, the cavity 16 is generally rectangular in shape in the cross section shown in FIG. 1 (but with depth of the cavity being greater toward the top of the tilt switch apparatus than at the bottom on account of the cavity having a triangular shape in cross section at approximately ninety degrees from the cross section of FIG. 1, as shown in FIG. 2), with a cavity first side 16*a* oriented towards and adjacent the power switch module 13, and with a base vertex 28 in a parallel, spaced apart relation to the cavity first side 16*a*, the base vertex 28 being oriented generally downwards relative to the housing cover 12*a*.

Figure 3:
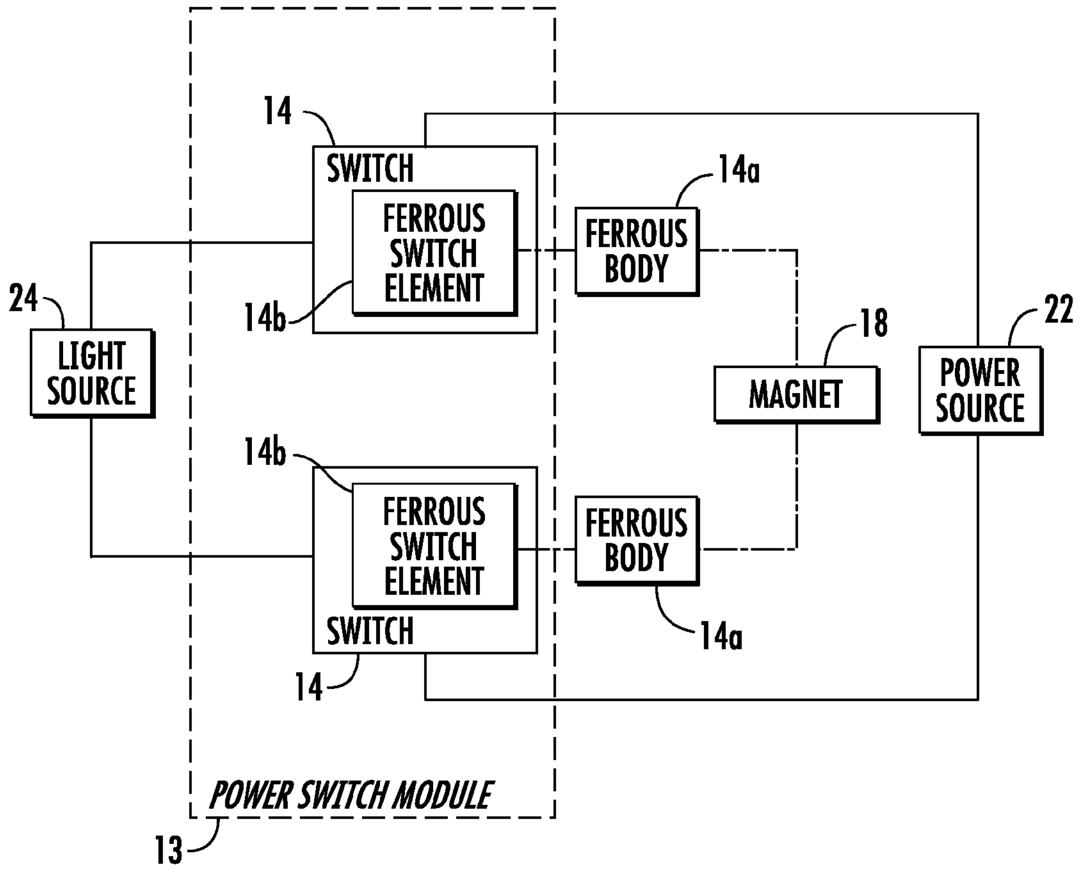
FIG. 3 is a block diagram showing the electrical communication of the power switch module, light source, and power source.
Figure 4:
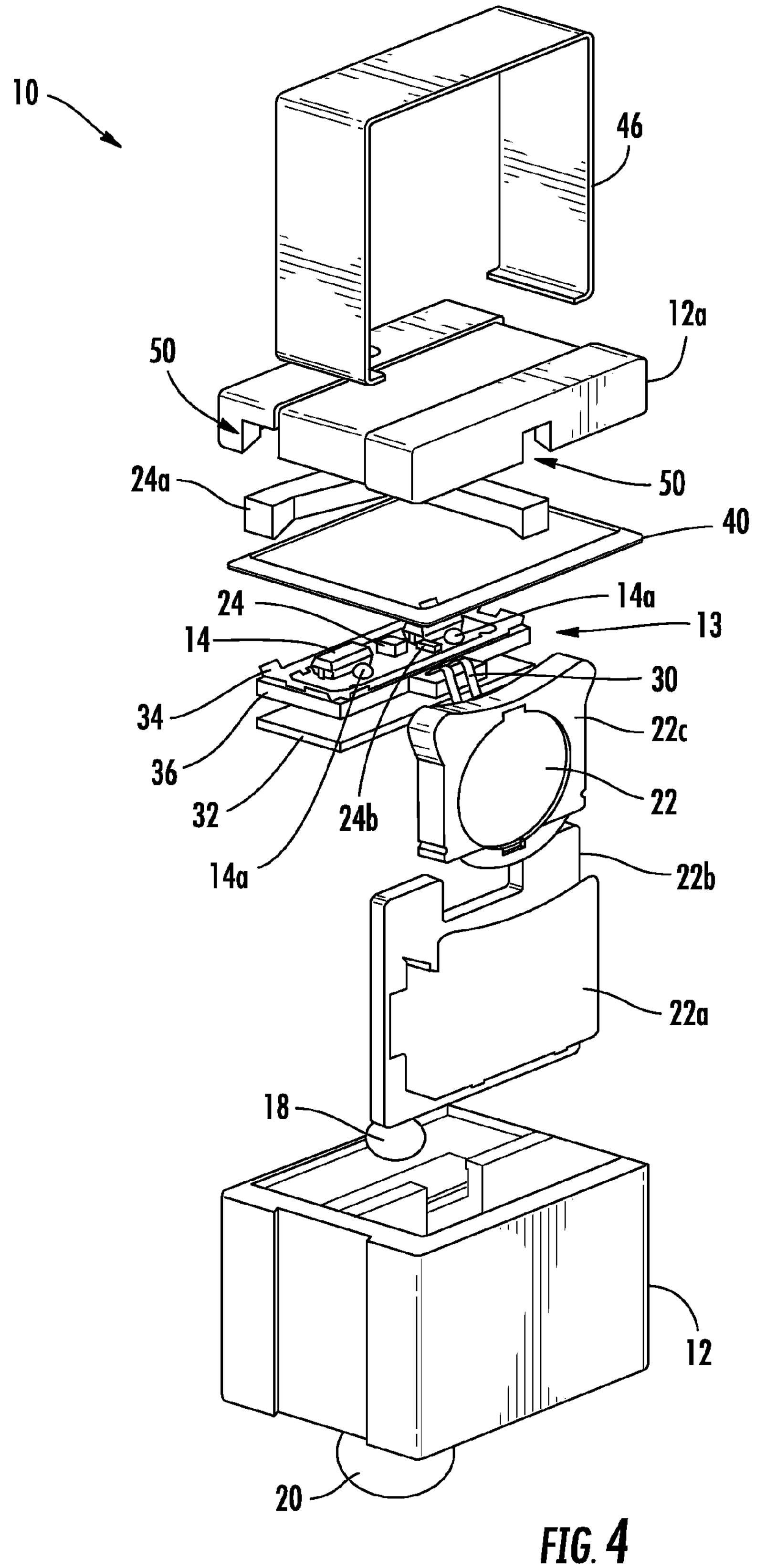
FIG. 4 is a perspective, exploded view of the tilt switch activated light apparatus according to the invention.

Referring more particularly to FIGS. 2-4, the cavity 16 is generally triangular in shape in the cross section shown in these figures, and a magnet 18 of typically spherical shape is disposed within the cavity. A first gasket 32 separates the cavity 16 from the power switch module 13. The power switch module 13 is further comprised of a power switch module printed circuit board 36 abutting the first gasket 32, and having a retainer 34 affixed along its perimeter. Two switches 14, each including a ferrous switch element 14*b* (FIG. 3), are affixed to the printed circuit board 36 in a desired location and a ferrous (iron-bearing) body 14*a* (in the shape of a sphere or otherwise shaped) serving as a magnetic field concentrator is positioned adjacent each switch 14. Each ferrous body 14*a* is disposed proximate a respective one of the switches 14 and fixed in position. When the magnet 18 inside the cavity moves to a position proximate one of the switches as a result of excessive roll or pitch, the magnet 18 will be more forcefully held in position by its magnetic attraction to the ferrous body 14*a*, and at the same time, and partially as a result of the concentrating effect of the ferrous body 14*a*, the magnet 18 will pull on the ferrous switch element 14*b* moving it from an open position to a closed position. (Any material indicated here as ferrous, could of course be any one of various other ferromagnetic materials instead.)

In the embodiment shown in FIGS. 1-4, two switches 14 and two corresponding ferrous bodies 14*a* are used on either side of the cavity 16 (FIG. 1) because in the embodiment shown, the magnetic sphere/ball may roll or fall toward one side of the cavity or the other. It should be understood, however, that other embodiments may include fewer or greater numbers of switches and ferrous bodies as needed, depending for example on the shape of the cavity. Further, in the embodiment shown in FIGS. 1-4, the ferrous body 14*a* is typically spherical in shape, however it need not be spherical.

A light source 24, typically a light emitting diode and associated set resistor, are affixed to the printed circuit board 36. Two pins 30 transfer power from a power source 22 mounted on a power source printed circuit board 22*b* to the power switch module printed circuit board 36 and hence to the light source 24 via one or another of the switches 14. The power source 22 is held secure by a retainer 22*c* that fits into a holder 22*a*.

A second gasket 40 secures the power switch module 13 and the power source 22 within the housing 12. Sandwiched between the second gasket 40 and the housing cover 12*a* is a light pipe 24*a* extending from the housing interior to at least one aperture 50 cut into the housing cover 12*a*. When the light source 24 is turned on (by the power switch module 13), light passes through the light pipe 24*a* and exits through the aperture 50 in the housing cover 12*a*, thus making it possible for a vehicle occupant to locate the tilt switch activated light apparatus, which would be positioned proximate to, or attached to, or embedded in a vehicle egress. In a particularly advantageous application, the tilt switch apparatus would be embedded in a release mechanism for a vehicle egress, in such a way that light from the light source is easily visible by occupants of the vehicle.

In a typical embodiment, a sufficient quantity of damping fluid 26 is provided inside the cavity 16 to dampen motion of the magnet 18 when the vehicle is operated under normal conditions. The damping fluid may be comprised of a silicone-based fluid, such as Damping Dow Corning Fluid 510 500 CS 500 ml Clear Fluid mixed with Damping Dow Corning Fluid 510 100 CS 500 ml Clear, in a 50/50 mix, which yields about a viscosity of ~300 centistokes, however any damping fluid with viscosity suitable for the present invention may also be used, i.e. with viscosity that provides enough damping to essentially eliminate false indications of excessive roll or pitch, but not so great as to prevent an indication in the event of actual excessive roll or pitch. A suitable viscosity would usually be less than 500 centipoise, but greater than 50 centipoise. The operational temperature range for the Damping Dow Corning Fluid mixture mentioned above is approximately −40 to +158 degrees Fahrenheit, however a damping fluid with a narrower or broader working temperature range may also be suitable. The quantity of damping fluid shown in FIG. 2 is for illustration purposes only, and the actual amount used will vary depending primarily on the viscosity of the fluid used, however the quantity of damping fluid preferred is one which ensures the entire magnet 18 is substantially covered and is always travelling in the fluid (independent of the orientation of the apparatus 10).

During normal vehicle operation, i.e. while the vehicle roll and pitch are within operational limits, the magnet 18 remains positioned at the base vertex 28. In the event of vehicular roll or pitch exceeding a predetermined limit (which may be defined in terms of a maximum angle of pitch or roll), the magnet 18, pulled by gravity, changes position within the cavity by moving to an area directly adjacent one or another of the switches 14 and respective ferrous bodies 14*a*. The magnet 18 pulls on the ferrous switch element 14*b* of the (normally open) switch, closing the switch and thus supplying power to the light source 24. The light generated enters the light pipe 24*a* and exits out the housing cover 12*a*, providing a guide to the egress structure. In the embodiment shown in the figures (and so including ferrous body 14*a*), the magnet 18 maintains engagement with the ferrous switch element by virtue not only of its magnetic attraction to the ferrous switch element 14*b*, but also on account of its magnetic attraction to the ferrous body 14*a* proximate to the switch, thus keeping the switch closed and the light activated. In some embodiments, it may be desirable to have the magnet 18 disengage from the ferrous switch element 14*b* more easily, and in such embodiments a ferrous body 14*a* (magnetic field concentrator) would not be used. In some other embodiments, a magnet of such size and shape could be used so as not to require a ferrous body to help hold the magnet proximate to the switch following excessive roll or pitch.

As indicated in FIG. 2, in the embodiment shown, gravity causes the magnet 18 to move to either a first target position 42 or a second target position 44 proximate to one or the other of the switches 14, depending on the direction of roll of the vehicle, when the roll angle of the tilt switch activated light apparatus 10 is about 60 degrees from the neutral (horizontal) position and/or the pitch angle of the apparatus 10 is about 90 degrees. The roll and/or pitch angles at which the apparatus will light up may be adjusted most readily by varying the shape of the cavity. Other ways include changing the number of cavities, or altering the locations of the switches, or adding multiple switches, or altering the properties of the magnet (its shape or material) or using more than one magnet.

As shown in the figures, a tilt switch activated light apparatus 10 according to the invention may be provided with a ferrous (or otherwise ferromagnetic) or magnetic external body 20 external to the housing and separable from the housing, for holding the (interior) magnet 18 in a neutral position (not engaging the switch 14) inside the cavity 16 during shipping of the apparatus. Upon installation or after resetting the tilt switch activated light apparatus, i.e. when the apparatus is configured for use, the external body 20 is removed. In the embodiment shown in the figures, the external body 20 is positioned in an indentation on the outside of the housing 12, proximate the base vertex 28, and the external body 20 is provided so as to have either sufficient ferrous bulk or magnetic strength that, when the external body 20 is so positioned, it will prevent the (internal) magnet 18 from moving away from the base vertex 28. A further separate reset tool (not shown) may be provided to move the magnet 18 back to the base vertex 28 after a tilt event.

The (interior) magnet 18 is advantageously comprised of neodymium iron boron (NIB), however any magnetic material may be used for the (interior) magnet 18 or, if the external body 20 is provided as a magnetic material, for the external body 20. The magnet 18 and the external body 20 in the embodiment shown in FIGS. 1-4 are generally spherical in shape, however, other shapes such as cylinders may be used.

A suitable switch for use as the switch 14 in the embodiment shown in FIGS. 1-4 is a magnetically operated Reed proximity sensor, available from Meder Electronic (www.meder.com).

It is to be understood that the above-described arrangements are only illustrative of the application of the principles of the present invention. The term "vehicle" here is used to denote any land, air or sea vehicle in which excessive pitch and/or roll is of concern when operating the vehicle. Also, numerous modifications and alternative arrangements may be devised by those skilled in the art without departing from the scope of the present invention, and the appended claims are intended to cover such modifications and arrangements.

What is claimed is:

1. An apparatus, comprising:

a housing having at least one exterior wall defining an interior space, the interior space including a cavity of a predetermined size and shape;

a switch, a light source, and an electrical power source, wherein the switch is in electrical communication with the light source and the power source, and wherein the switch includes a ferromagnetic element disposed so that in one position the switch is open and in another position the switch is closed; and a magnet disposed within the cavity, the magnet having a magnetic field;

wherein the apparatus is provided in a form suitable for use as a component of or an attachment to an egress from a vehicle, and wherein the cavity is shaped and disposed within the housing and relative to the ferromagnetic switch element so that in the event of roll or pitch in excess of a predetermined extent, the magnet moves with the cavity to a location proximate to the ferromagnetic switch element and by magnetic attraction causes the ferromagnetic switch element to move to the closed position, thereby connecting the light source to the power source and so turning on the light source for use as a guide to vehicle occupants in locating the egress.

2. The apparatus of claim 1, wherein the cavity is filled with a fluid for damping the motion of the magnet disposed in the cavity.

3. The apparatus of claim 1, further comprising a second switch in spaced apart relation from the other switch and also connected to the power source and to the light source.

4. The apparatus of claim 1, further comprising an external body, external to and separable from the housing, and further wherein the housing includes an indentation on an outer surface of a shape allowing the external body to be at least partially lodged in the indentation.

5. The apparatus of claim 1, further comprising a ferromagnetic body fixedly disposed proximate to the switch.

* * * * *